(12) United States Patent
D'hondt et al.

(10) Patent No.: US 8,197,567 B2
(45) Date of Patent: Jun. 12, 2012

(54) BLOW-OFF INCORPORATING APPARATUS FOR EVACUATING WATER AND DIRT FROM A COOLER BOX OF A COOLING SYSTEM

(75) Inventors: David D'hondt, Zedelgem (BE); Rudi Verbeek, Roeselare (BE)

(73) Assignee: CNH America LLC, New Holland, PA (US)

( * ) Notice: Subject to any disclaimer, the term of this patent is extended or adjusted under 35 U.S.C. 154(b) by 1091 days.

(21) Appl. No.: 12/148,240

(22) Filed: Apr. 17, 2008

(65) Prior Publication Data

US 2008/0261507 A1 Oct. 23, 2008

Related U.S. Application Data

(60) Provisional application No. 60/925,078, filed on Apr. 18, 2007.

(51) Int. Cl.
*B01D 46/00* (2006.01)
(52) U.S. Cl. .......... 55/290; 55/302; 55/385.3; 55/467.1; 55/471; 460/100; 460/117
(58) Field of Classification Search .............. 55/290, 55/294, 302, 385.1, 385.3; 95/279, 280; 460/100, 117, 119
See application file for complete search history.

(56) References Cited

U.S. PATENT DOCUMENTS

| | | | |
|---|---|---|---|
| 3,233,391 A | 2/1966 | Olsen | 55/290 |
| 3,307,336 A | 3/1967 | Dewsherry | 55/337 |
| 3,429,108 A | 2/1969 | Larson | 55/432 |
| 3,616,618 A | 11/1971 | Gronholz et al. | 55/337 |
| 3,934,992 A | 1/1976 | Thompson | 55/324 |
| 4,235,298 A | 11/1980 | Sackett et al. | 180/54 A |
| 4,764,191 A | 8/1988 | Morelli | 55/302 |
| 5,022,479 A | 6/1991 | Kiser et al. | 180/68.3 |
| 5,034,036 A | 7/1991 | Creek et al. | 55/201 |
| 5,466,189 A * | 11/1995 | Deutsch et al. | 460/100 |
| 5,660,243 A | 8/1997 | Anzalone et al. | 180/68.1 |

(Continued)

FOREIGN PATENT DOCUMENTS

JP  5511010  1/1980

(Continued)

OTHER PUBLICATIONS

2 pp. Brochure, Cameco, a John Deere Company, 3510 Sugarcane Harvester, 2008.

*Primary Examiner* — Duane Smith
*Assistant Examiner* — Minh-Chau Pham
(74) *Attorney, Agent, or Firm* — Patrick M. Sheldrake (57) ABSTRACT

Apparatus for evacuating water and dirt from a cooler box of a cooling system, incorporated with a blow-off for an air screen of the system. The water and dirt will flow through an aperture in a lower region of the cooler box into a smaller box of the apparatus disposed therebelow. A fan operable for generating the air flow through the air screen and the cooler box, also blows a portion of the flow through a blow-off channel to the air screen for blowing debris away from the air screen. The channel and smaller box are cooperatively configured such that the air flow through the channel will generate a partial vacuum condition in the smaller box operable for evacuating the water and the dirt into the channel so as to be carried away with debris from the air screen.

21 Claims, 9 Drawing Sheets

| U.S. PATENT DOCUMENTS | | | | |
|---|---|---|---|---|
| 5,827,338 A * | 10/1998 | Horvat | ............................. | 55/285 |
| 5,901,786 A | 5/1999 | Patel et al. | ..................... | 165/283 |
| 6,272,819 B1 | 8/2001 | Wendte et al. | ................. | 56/11.9 |
| 7,188,599 B2 | 3/2007 | Chaney et al. | ............. | 123/198 E |
| 7,981,175 B2 * | 7/2011 | D'Hondt | ......................... | 55/290 |
| 2007/0022720 A1 * | 2/2007 | Guertin | ............................ | 55/289 |

FOREIGN PATENT DOCUMENTS

| JP | 63247118 | 10/1988 |
|---|---|---|
| JP | 200173889 | 3/2001 |

\* cited by examiner

BLOW-OFF INCORPORATING APPARATUS FOR EVACUATING WATER AND DIRT FROM A COOLER BOX OF A COOLING SYSTEM

This application claims the benefit of U.S. Provisional Application No. 60/925,078, filed Apr. 18, 2007.

TECHNICAL FIELD

The present invention generally relates to apparatus for evacuating water and dirt from a box or enclosure of a cooling system, and, more particularly, to a blow-off for an air screen of a cooling system, configured for evacuating water and dirt from a cooler box of the system.

BACKGROUND ART

The disclosure of U.S. Provisional Application No. 60/925,078, filed Apr. 18, 2007, is hereby incorporated herein in its entirety by reference.

Cooling systems of work machines used in the outdoors, for instance, harvesting machines, and in particular, sugarcane harvesters, typically include at least one box or housing through which an air flow is directed for cooling elements of various systems of the machine. Such housing or housings may contain or be adjacent to one or more heat exchangers. To prevent entry of contaminants and for cooling system efficiency, such boxes are typically sealed, except for air inlet and outlet paths. The air inlet is typically covered by an air screen. Due to the dusty and dirty environments in which such machines are utilized, the air screen will require blow-off of debris, dust and dirt, periodically, or from time to time. Accordingly, some cooling systems include a blow-off apparatus or system for this purpose. Further, some blow-offs utilize an air flow generated by a fan of the cooling system for generating the air flow through the cooler box.

Cooler boxes are typically sealed, except for the air inlet and outlet, and they are often not self-draining. The bottom of cooler boxes can thus accumulate water and dirt, which can reach several centimeters deep, and become foul. When an engine air cleaner receives air through a cooler box, and the air intake aperture is located in a lower region of the box, it is important that no water enter or be sucked into the air filter. This water can also accumulate in the cooler box due to the lack of a drain.

Accordingly, what is sought is apparatus for evacuating water and dirt from a box of a cooling system, that utilizes available air flow of a blow-off for cleaning an air screen of the system and also operates as a sealing during normal operation, and thus overcomes one or more of the problems set forth above.

SUMMARY OF THE INVENTION

What is provided is apparatus for evacuating water and dirt from a cooler box of a cooling system, that utilizes air flow of a blow-off for an air screen of the system, and thus overcomes one or more of the problems set forth above.

According to a preferred aspect of the invention, the cooler box includes a lower peripheral enclosure having an aperture therein through which water and dirt can pass from the cooler box. A smaller box of the apparatus is disposed beneath the aperture for receiving the water and the dirt. A fan is operable for generating the air flow through the air screen and the cooler box. A blow-off includes an air flow or blow-off channel having an inlet disposed for receiving a portion of the air flow and including a channel section disposed and configured for directing the portion of the air flow along a portion of the air screen for blowing debris away from the air screen. The blow-off channel is configured for evacuating the water and dirt, and is connected to the smaller box by an opening or orifice, so as to be cooperatively configured as a vacuum generator, so that the portion of the air flow through the channel will generate a partial vacuum condition in the smaller box operable for evacuating the water and the dirt from the smaller box into the channel so as to be carried away by the portion of the air flow.

As an advantage of the invention, water and dirt is evacuated along with debris from the air screen. As another advantage, economy and simplicity are obtained by combining the blow-off and water and dirt evacuation functions.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
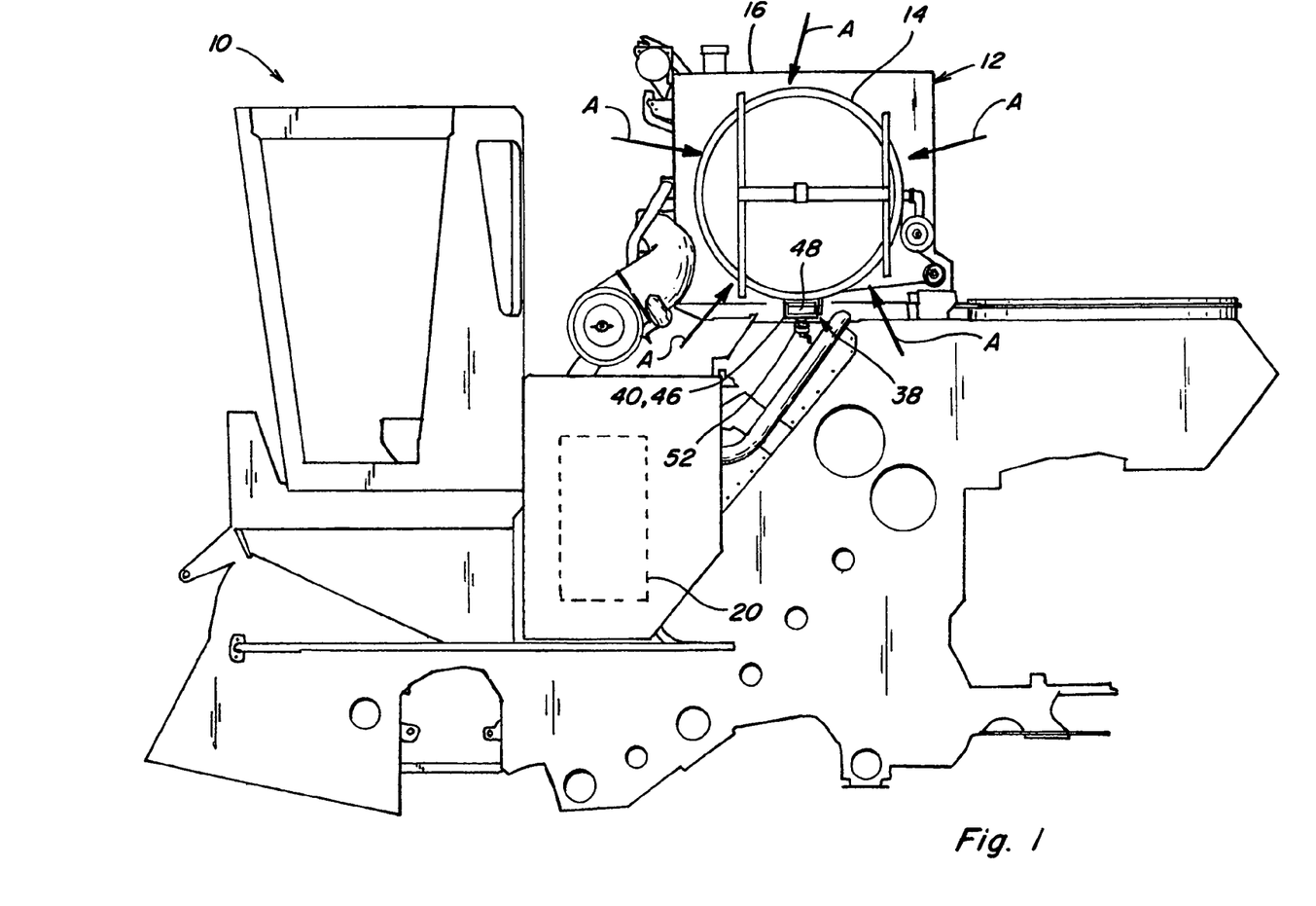
FIG. 1 is a side view of a frame of a sugarcane harvester including apparatus of the invention.
Figure 2:
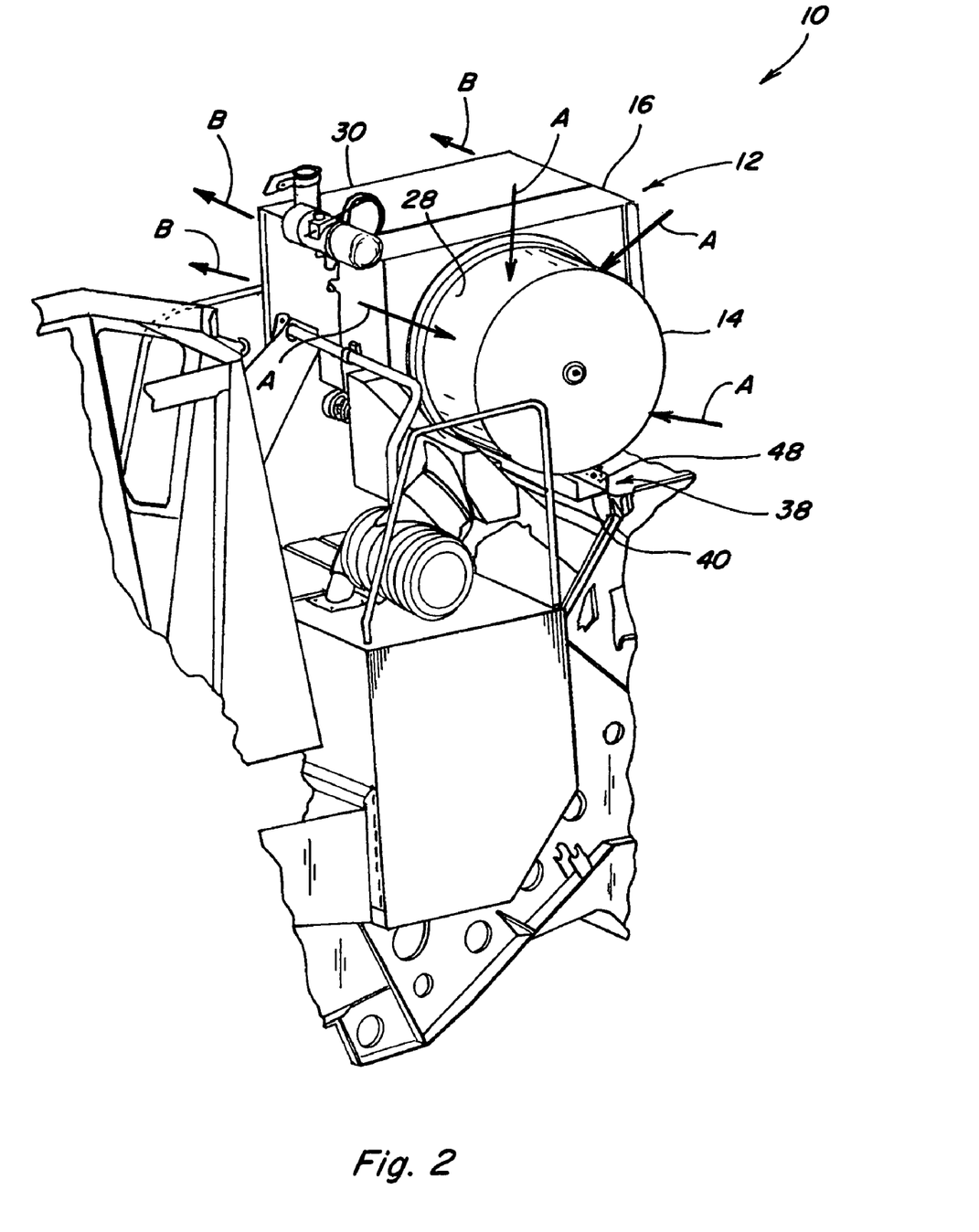
FIG. 2 is a simplified fragmentary perspective view of the harvester frame of FIG. 1 showing aspects of the apparatus of the invention.
Figure 3:
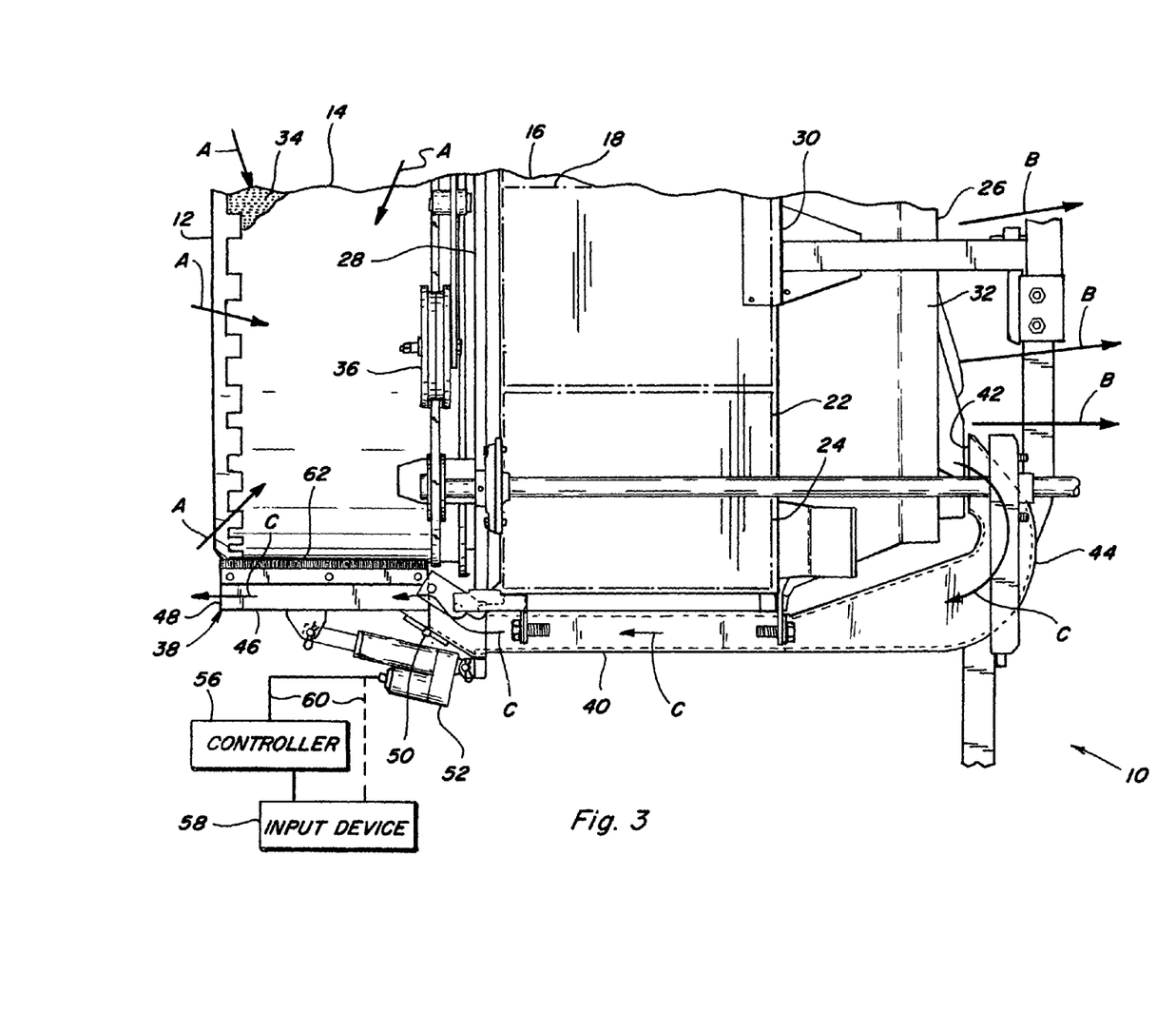
FIG. 3 is a fragmentary rear view of the apparatus of the invention.

Referring now to the drawings, in FIGS. 1, 2 and 3, a frame of a representative work machine, which is a sugarcane harvester frame 10, is shown including a cooling system 12 for cooling elements of the harvester in the well-known manner. Frame 10, when additional components are added, including wheels and driveline, harvesting apparatus, operator controls, and other well known features, will comprise a complete sugarcane harvester of well known construction. Reference in this regard, U.S. Pat. No. 6,272,819, which discloses a complete sugarcane harvester.

Cooling system 12 includes a rotary air screen 14 constructed and operable in a well-known manner, covering an air inlet to a cooler box 16 of cooling system 12 containing at least one heat exchanger. Here, the heat exchangers are arranged in a vertical stack within cooler box 16, and include a radiator 18 (FIG. 3) in an uppermost position in the stack, for cooling coolant of an engine 20 (FIG. 1); an oil cooler 22 in a middle position, for cooling oil of a hydraulic system (not shown); and an intercooler radiator 24 in the lowest position. Here, it should be noted that other heat exchanger arrangements can be used as desired or required for a particular application.

Cooling system 12 includes a fan box 26 on the end of cooler box 16 opposite air screen 14, containing a fan rotatable for generating a flow of air into air screen 14, as denoted by arrows A, through cooler box 16, so as to pass through radiator 18, oil cooler 22, and intercooler radiator 24, and through an outlet 30 of box 16, and through fan box 26, so as to be discharged from an outlet 32 thereof, as denoted by arrows B.

Rotary air screen 14 is a cylindrical structure having an outer circumferential surface which comprises a perforated screen surface 34 for the entry of a flow of air A. In this embodiment, air screen 14 is rotated in the well known manner about its cylindrical axis by a belt drive 36 driven by engine 20. Air screen 14 is rotated principally for cleaning, as work machines, and particularly harvesters such as sugarcane harvesters like harvester 10, are typically operated in dirty and dusty environments, the dirt and dust being drawn against the outer surface of screen 14 by air flow A. Larger loose items, particularly leaves, will also be present in the cane harvesting environment, and can be drawn and held against screen 14. This can be particularly problematic, as cane leaves, dirt and dust in the cane harvesting environment will typically carry sucrose, which is sticky, and if allowed to build up, will adhere itself and other matter to screen 14. As result, it is desirable to have the capability of removing this matter from the outer surface of screen 14. It is also desirable to have a self-cleaning capability, as a result of the volume of the matter that can build up and interfere with the operation of the apparatus.

Figure 4:
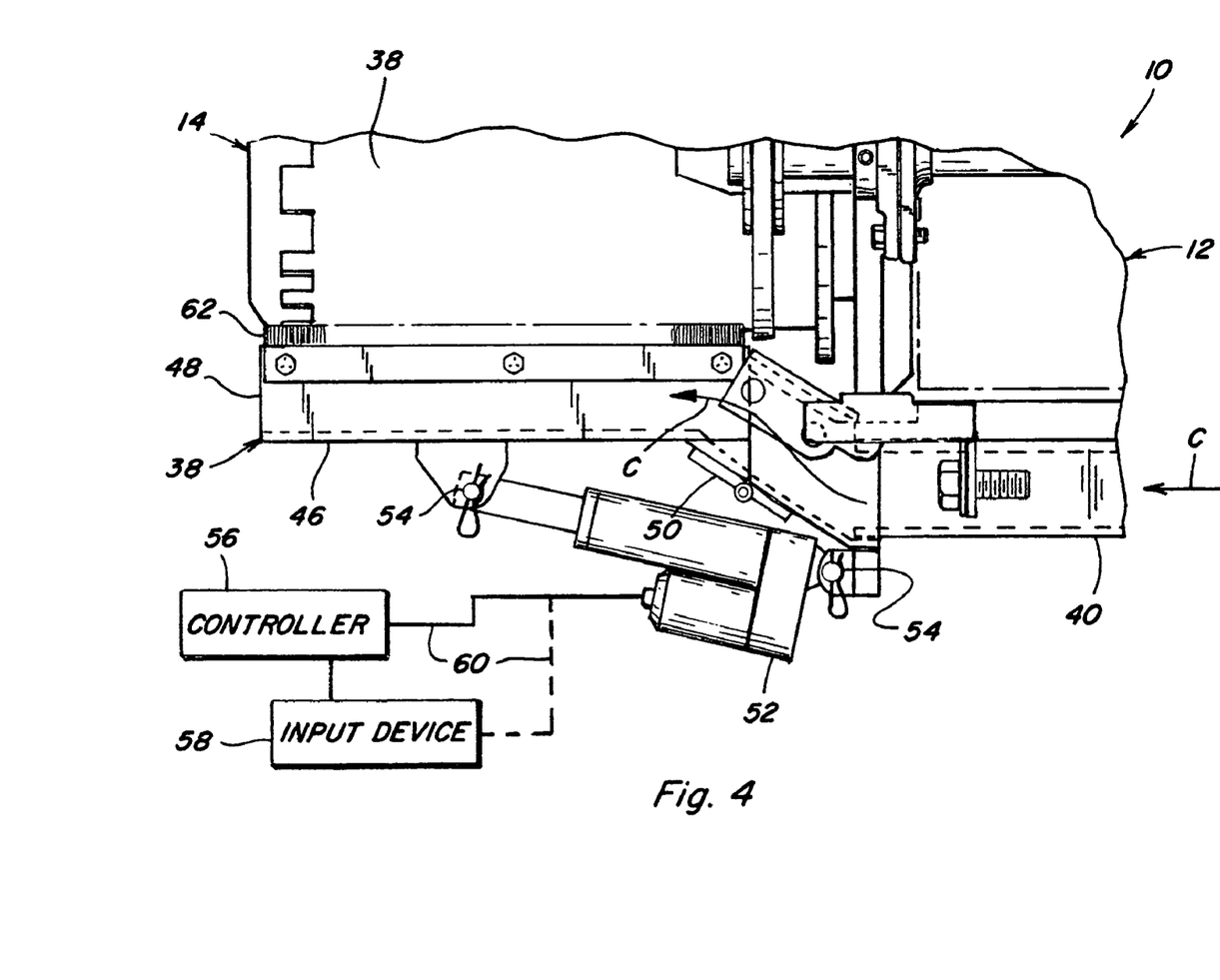
FIG. 4 is an enlarged fragmentary rear view of the apparatus of the invention.
Figure 5:
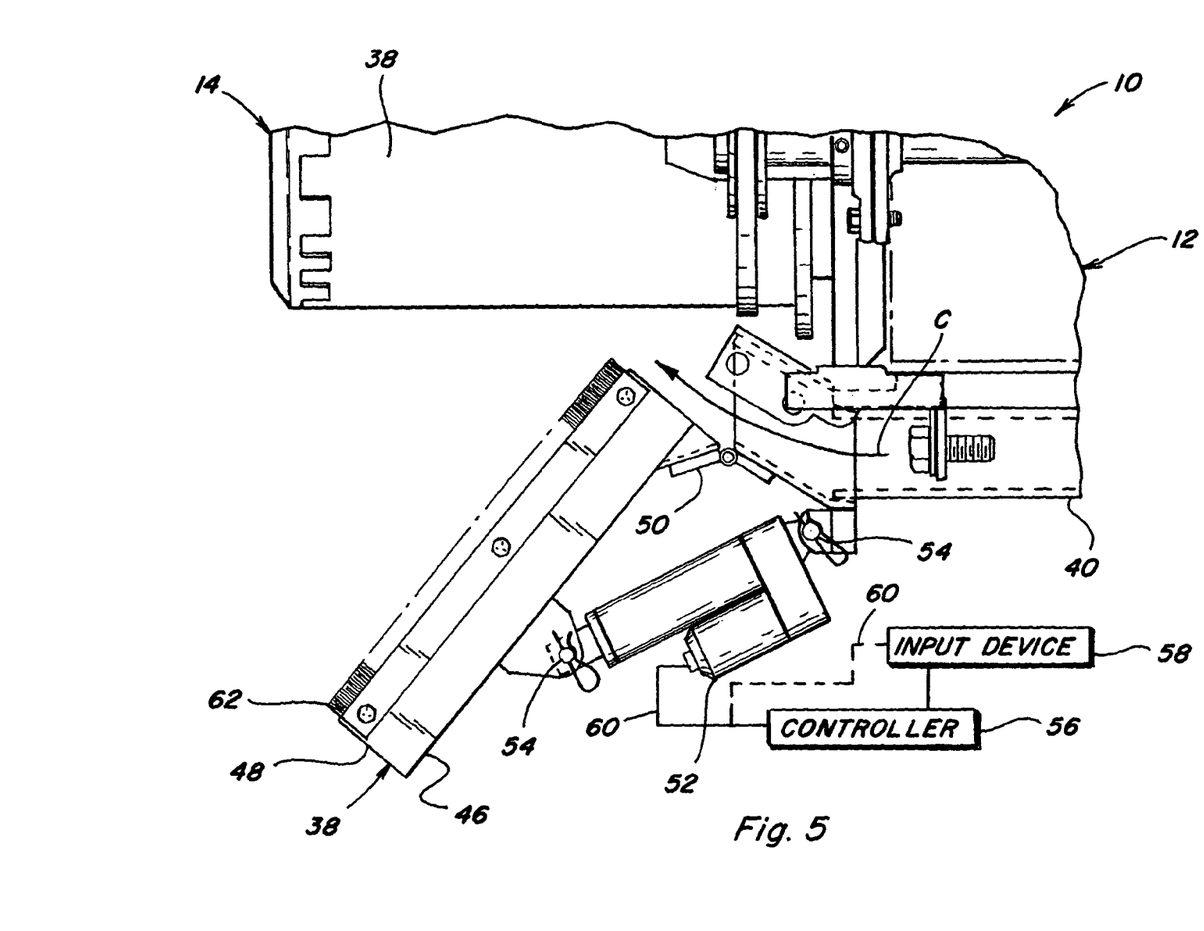
FIG. 5 is another enlarged fragmentary rear view of the apparatus.
Figure 6:
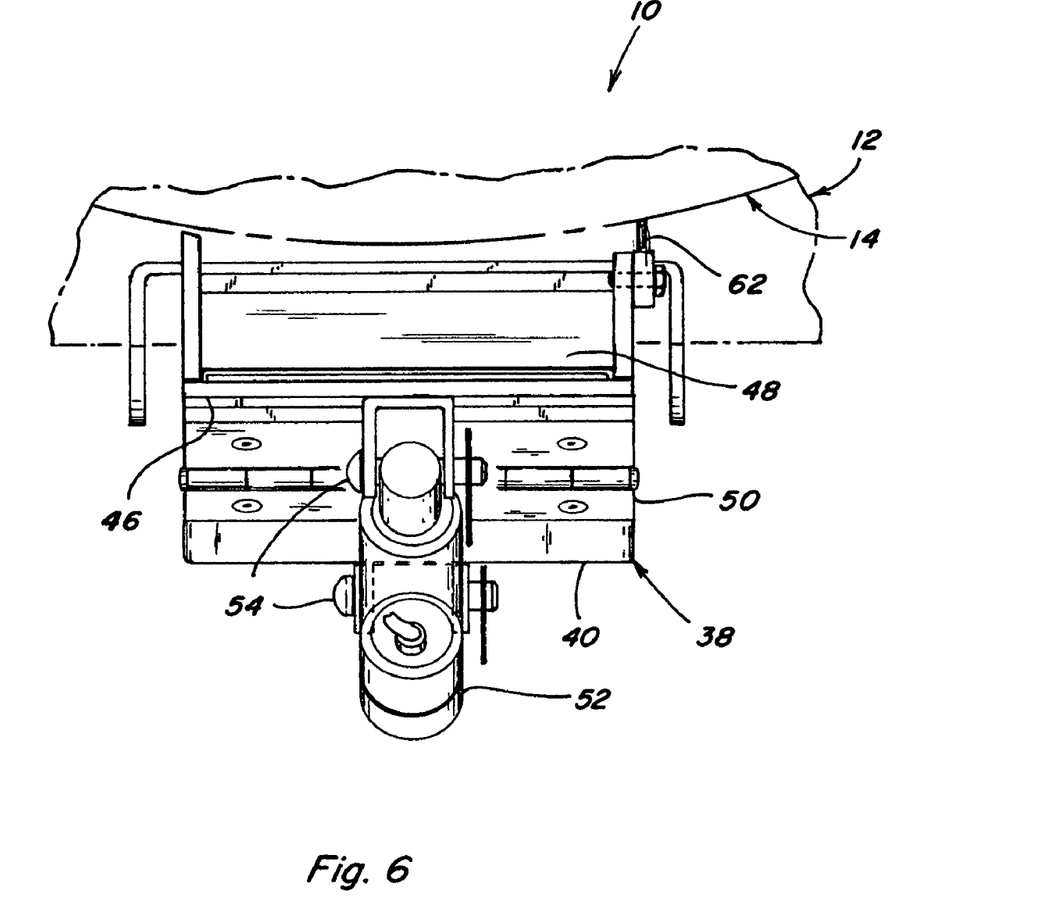
FIG. 6 is an enlarged fragmentary side view of the apparatus.

Referring also to FIGS. 4, 5, and 6, a self-cleaning blow-off 38 constructed and operable according to the teachings of the invention is shown. Self-cleaning blow-off 38 is configured and operable in a operational or blow-off mode for substantially continuously removing debris or matter, including, but not limited to, leaves, dirt, and dust, from perforated screen surface 34, as screen 14 rotates. Additionally, blow-off 38 is operable in a self-cleaning mode for releasing or shedding matter that has built up as result of operation in the blow-off mode. Blow-off 38 can be operated in the self-cleaning mode periodically, from time to time, or responsive to an input, such as, but not limited to, an operator input or an automatic input from a sensor or the like generated when self-cleaning is required.

Blow-off 38 includes a blow-off channel 40 which has an inlet 42 (FIG. 3) disposed adjacent a suitable source of pressurized fluid, which is preferably outlet 32 of fan box 26, for receiving a portion of flow of air B, and redirecting it toward air screen 14, as denoted by arrow C. Channel 40 includes a preliminary blow-off channel section 44, which includes inlet 42, and which has a C-shape when viewed from the side for redirecting the air flow C toward screen 14. Section 44 also narrows down or reduces in sectional extent downstream of inlet 42, for increasing air flow velocity therein. Preliminary blow-off channel section 44 extends beneath fan box 26 and cooler box 16, and slants upwardly toward the bottom of air screen 14. At this location, preliminary blow-off channel section 44 connects with a movable blow-off channel section 46, into which air flow C is directed.

Movable blow-off channel section 46 is an upwardly open U-shape member and extends to a discharge outlet 48 located below the end of screen 14. Movable blow-off channel section 46 is configured and supported to be movable between an operational position disposed directly beneath screen surface 34 of air screen 14, and a cleaning position disposed away from screen 34. In the operational position, movable blow-off channel section 46 is positioned for directing flow of air C along screen surface 34 for blowing debris and dirt, e.g., leaves, dirt, and dust, outwardly away through discharge outlet 48. In the cleaning position, channel section 46 is preferably turned so as to be angled or slanted downwardly away from screen 14, so as to release any built up or accumulated debris or matter from section 46 and also screen surface 34.

Movable blow-off channel section 46 is preferably connected by a connector 50 to section 44 for movement up and down between the operational and cleaning positions. The preferred connector 50 is a pivot or hinge, such as, but not limited to, a mechanical or living hinge, although other movable connectors could be used. An actuator 52 is connected between sections 44 and 46 and is controllably operable for effecting movements of section 46 between the operational and cleaning positions. Here, actuator 52 is preferably a linear actuator, but, other actuators such as, but not limited to, a rotary actuator, could be used. Actuator 52 can be electrically, fluid, or otherwise suitably powered, as desired. Actuator 52 is connected to sections 44 and 46 by pivots 54, and is extendable (FIGS. 1, 3, 4, and 6) for holding section 46 in the operational position, and retractable (FIG. 5) for pivoting or turning section 46 downwardly to the cleaning position.

A controller 56 is preferably connected in operative control of actuator 52, and connected to an input device 58, via suitable conductive paths 60, which can be for instance, a wire or wires of a wiring harness, or a wireless communications network. In normal conditions (no self-cleaning action is taking place) blow-off 38 will operate with movable blow-off channel 46 in the operative position for directing flow of air C across perforated surface 34, for removing debris such as leaves, dirt and dust. This matter will be directed along the channel, and will be discharged through discharge outlet 48. A panel (not shown) can be placed within screen 14, just above channel 46, for reducing air flow through the screen at that location, to facilitate release of any adhered matter. Channel 46 can also include one or more brushes 62 extending lengthwise therealong, for brushing perforated surface 34, or spaced marginally therefrom, for brushing matter away, and will also operate for limiting escape of air from the channel to the side.

From time to time, or when movable channel section 46 is blocked, actuator 52 will be operated to move channel section 46 to the cleaning position, away from rotary screen 14. This will cause any debris that blocks the channel to fall and thus be evacuated from the channel so as to effectively clean the channel. After a selected amount of time, actuator 52 will be operated to move channel section 46 back to the operational position. This completes one self-cleaning cycle. In one mode of operation, during a certain timeframe, this cycle can be repeated several times.

As another possible mode of operation, channel section 46 can be moved to the cleaning position manually, for instance by operator actuation of input device 58. For this purpose, input device 58 can be configured as a pushbutton or other suitable operator controllable input device. As another possibility, input device 58 can comprise a sensor, for instance, one which detects when channel section 46 is blocked, and which can generate a signal to controller 56, and/or which can activate an alarm in an operator cab to inform the operator of the blockage such that the operator can manually actuate the operator input, e.g., pushbutton.

As still another option, controller 56 can be a programmable device including software, or a timer device, which will operate actuator 52 at certain times; or it can be linked to the operation of other parts/functions of the machine, e.g., activation of the unloading tube if used with a combine harvester or the like.

As a desirable advantage of the self-cleaning blow-off of the invention, under heavy fouling conditions of the air screen, stopping operation is not required to clean the blow-off channel manually.

As another advantage, the blow-off can be mounted in a variety of locations about a rotary screen. For instance, an upper region of the rotary air screen, such that, when the blow-off is moved away from the screen, the released debris and dirt from the blockage will be pushed away by the rotation of the screen. If the blow-off is mounted on a lower region of the screen, the released dirt will be removed by gravity, and, in addition, possible vibrations due to operation of the machine.

Figure 7:
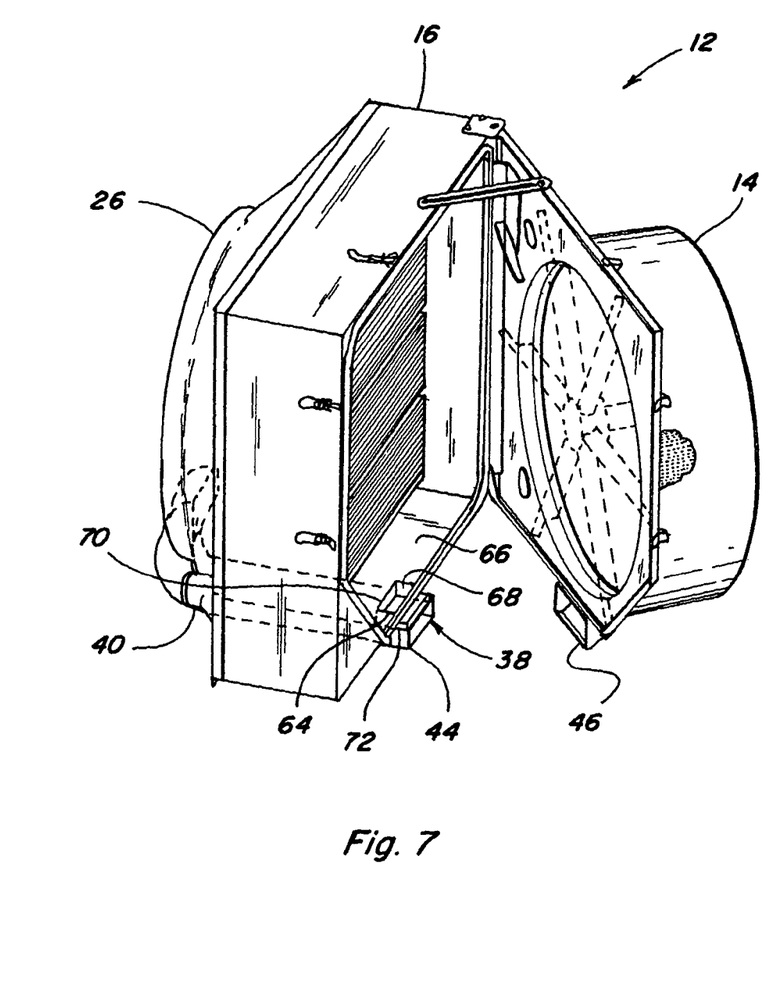
FIG. 7 is a perspective view of the apparatus, showing a cooler box thereof opened.
Figure 8:
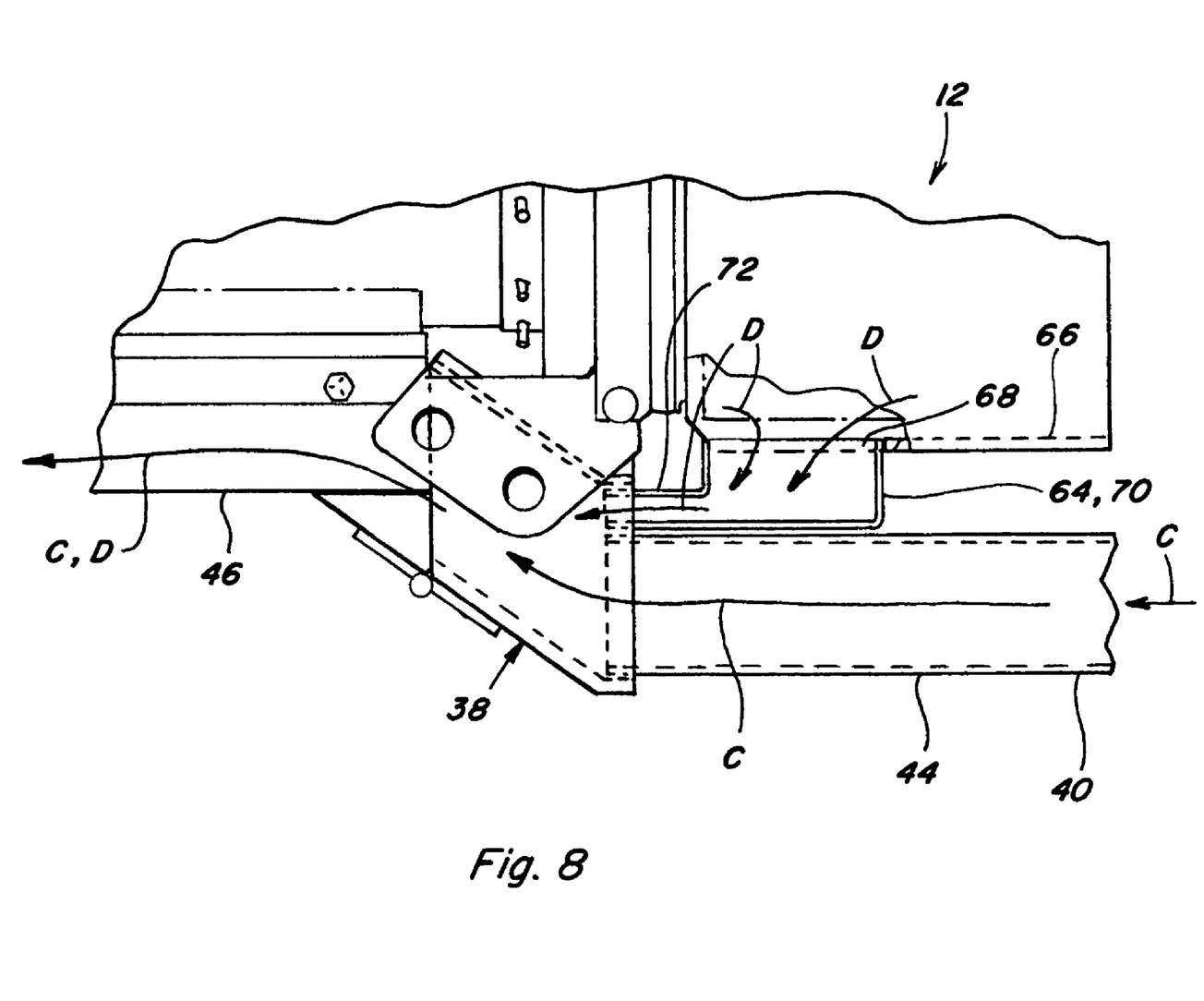
FIG. 8 is an enlarged fragmentary rear view of the apparatus.
Figure 9:
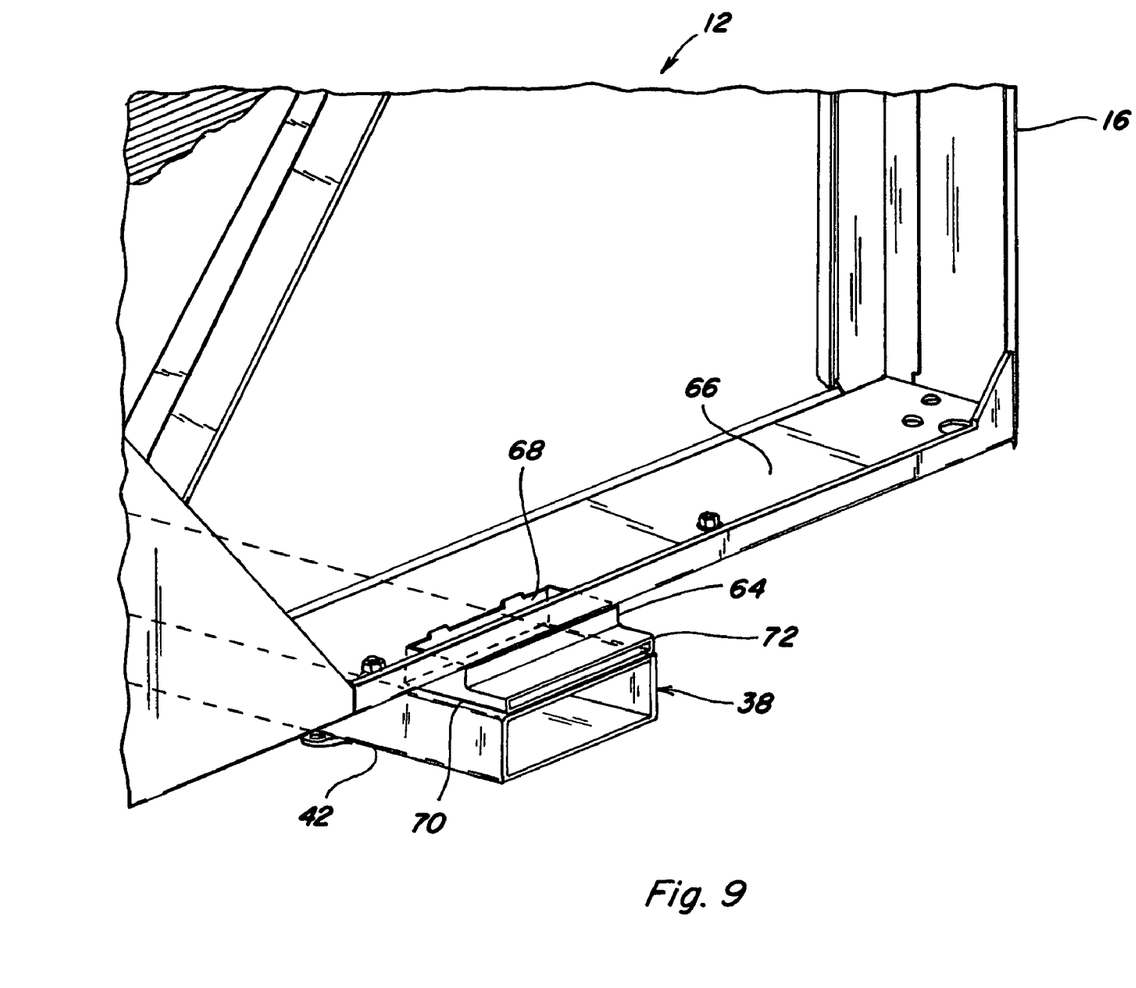
FIG. 9 is a fragmentary perspective view of the apparatus.

Referring also to FIGS. 7, 8 and 9, as another feature of the invention, blow-off 38 is illustrated incorporating apparatus 64 for evacuating water and dirt (represented by arrows D in FIG. 8) from cooler box 16 of cooling system 12, utilizing air flow C.

Cooler box 16 includes a lower peripheral enclosure or sheet 66, having an aperture 68 therein through which water and dirt (arrows D) can pass from the cooler box. This water and dirt will be present as a result of normal operation of cooling system 12, as explained above. A smaller box 70 of apparatus 64 is disposed beneath aperture 68 for receiving the water and the dirt. Smaller box 70 is preferably an L-shaped structure, including a passage of smaller sectional extent which includes a vacuum generating orifice 72 at the bottom, which connects with blow-off channel 40 through which air flow C, generated by the fan of fan box 26 as explained above, flows. Orifice 72 is also of smaller extent than the channel. Orifice 72 and channel 40 are preferably cooperatively configured such that air flow C will generate a partial vacuum condition in orifice 72. Channel 40 facilitates the vacuum generation by slanting up, across the opening of orifice 72, so as to direct flow C over the orifice to some degree. The partial vacuum condition generated in orifice 72 will be communicated to smaller box 70, where it will operate for evacuating the water and dirt, as denoted by arrows D, through orifice 72 into channel 40, and through the channel to outlet 48, so as to be discharged from the cooling system with the debris from the air screen. In this regard, orifice 72 preferably connects with channel 40 at about the juncture of channel sections 44 and 46, and is oriented to face in the direction of flow of air flow C, toward outlet 48 (see FIG. 3). The location at the juncture of channel sections 44 and 46 is also advantageous as cooler box 16 opens at that location (FIG. 7) to allow ease of cleaning and service of the components therein, as well as the disassembly and cleaning and service of channel sections 44 and 46, and smaller box 70 and orifice 72.

As an advantage of the invention, water and dirt in cooler box 16, represented by arrows D, are evacuated along with debris from air screen 14. As another advantage, economy and simplicity are obtained by combining the air screen blow-off and water and dirt evacuation functions. Disassembly, cleaning and service are also facilitated.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. Apparatus for evacuating water and dirt from a cooler box of a cooling system, comprising:
    a cooler box including a lower peripheral enclosure having an aperture therein, and a smaller box disposed beneath and upwardly open to the aperture and configured for collecting water and dirt from the cooler box;
    a fan for generating an air flow through an air screen, the cooler box, and at least one heat exchanger;
    a blow-off including a blow-off channel having an inlet disposed for receiving a portion of the air flow and including a channel section disposed and configured for directing the portion of the air flow on a portion of the air screen for blowing debris away from the air screen, the blow-off channel being connected to the smaller box in a manner such that the portion of the air flow through the channel will generate a partial vacuum condition in the smaller box operable for evacuating water and dirt from the smaller box into the channel.

2. Apparatus of claim 1, wherein the smaller box includes a vacuum generating orifice in connection with the channel section, configured and oriented for generating the partial vacuum condition.

3. Apparatus of claim 2, wherein the channel is disposed beneath the vacuum generating orifice.

4. Apparatus of claim 2, wherein the vacuum orifice faces downstream relative to a direction of movement of the portion of the air flow through the channel, and the channel is configured to direct at least a portion of the air flow therethrough across the orifice.

5. Apparatus of claim 4, wherein the orifice has a sectional extent smaller than a sectional extent of the smaller box.

6. Apparatus of claim 1, wherein the blow-off channel comprises two channel sections which are separable in the vicinity of the vacuum generating orifice for cleaning and service.

7. Apparatus of claim 1, wherein the air screen comprises a rotary air screen.

8. A cooling system for a work machine, comprising:
    an enclosed path for an air flow, including an air screen covering an air inlet, a cooler box disposed for receiving the air flow and containing at least one heat exchanger disposed for the passage of the air flow therethrough, the cooler box including a lower peripheral enclosure having an aperture therein through which water and dirt can pass from the cooler box, a smaller box disposed beneath the aperture for receiving the water and the dirt;
    a fan for generating the air flow through the air screen and the cooler box;
    a blow-off including a blow-off channel having an inlet disposed for receiving a portion of the air flow and including a channel section disposed and configured for directing the portion of the air flow along a portion of the air screen for blowing debris away from the air screen, the channel being connected to the smaller box and configured so that the portion of the air flow through the channel will generate a partial vacuum condition in the smaller box operable for evacuating the water and the dirt from the smaller box into the channel so as to be carried away by the portion of the air flow.

9. The cooling system of claim 8, wherein the blow-off channel has a shape at the connection to the smaller box for facilitating the generation of the partial vacuum condition in the smaller box.

10. The cooling system of claim 8, wherein the blow-off channel is disposed beneath the smaller box and the air screen.

11. The cooling system of claim 8, wherein the blow-off channel is connected to an interior of the smaller box by an opening facing downstream relative to a direction of flow of the portion of the air flow through the channel.

12. The cooling system of claim 11, wherein the opening has a sectional extent smaller than a sectional extent of the smaller box and a sectional extent of the channel.

13. The cooling system of claim 8, wherein the blow-off channel comprises a discharge outlet and is configured for evacuating the water and dirt therethrough with the debris from the screen.

14. A work machine, comprising:
    a cooling system including an enclosed path for an air flow, including an air screen covering an air inlet, a cooler box disposed for receiving the air flow and containing at least one heat exchanger disposed for the passage of the air flow therethrough, the cooler box including a lower peripheral enclosure having an aperture therein through which water and dirt can pass from the cooler box, a smaller box disposed beneath the aperture for receiving the water and the dirt, and a fan for generating the air flow through the air screen and the cooler box; and
    a blow-off including a blow-off channel having an inlet disposed for receiving a portion of the air flow and including a channel section disposed and configured for directing the portion of the air flow along a portion of the air screen for blowing debris away from the air screen, the blow-off channel being connected to the smaller box and configured so that the portion of the air flow through the channel will generate a partial vacuum condition in the smaller box operable for evacuating the water and the dirt from the smaller box into the channel so as to be carried away by the portion of the air flow.

15. The work machine of claim 14, wherein the blow-off channel has a shape at the connection to the smaller box for generating the partial vacuum condition in the smaller box.

16. The work machine of claim 14, wherein the blow-off channel is disposed beneath the smaller box and the air screen.

17. The work machine of claim 14, wherein the blow-off channel is connected to an interior of the smaller box by an opening facing downstream relative to a direction of flow of the portion of the air flow through the channel.

18. The work machine of claim 17, wherein the opening has a sectional extent smaller than a sectional extent of the smaller box.

19. The work machine of claim 14, wherein the blow-off channel comprises a discharge outlet and is configured for evacuating the water and dirt therethrough with the debris from the screen.

20. The work machine of claim 14, comprising a harvester.

21. The work machine of claim 20, wherein the harvester comprises a sugarcane harvester.

\* \* \* \* \*